US008976099B2

(12) United States Patent
Shah et al.

(10) Patent No.: US 8,976,099 B2
(45) Date of Patent: Mar. 10, 2015

(54) CHARGE STORAGE CIRCUIT FOR A PIXEL, AND A DISPLAY

(75) Inventors: Sunay Shah, Oxford (GB); Patrick Zebedee, Oxford (GB); Benjamin James Hadwen, Oxford (GB); Michael James Brownlow, Oxford (GB)

(73) Assignee: Sharp Kabushiki Kaisha, Osaka (JP)

( * ) Notice: Subject to any disclaimer, the term of this patent is extended or adjusted under 35 U.S.C. 154(b) by 631 days.

(21) Appl. No.: 13/151,445

(22) Filed: Jun. 2, 2011

(65) Prior Publication Data

US 2011/0298531 A1 Dec. 8, 2011

(30) Foreign Application Priority Data

Jun. 7, 2010 (GB) .................................. 1009480.3

(51) Int. Cl.
*G09G 3/36* (2006.01)
*G06F 3/038* (2013.01)

(52) U.S. Cl.
CPC ............ *G09G 3/3648* (2013.01); *G09G 3/3659* (2013.01); *G09G 2300/0465* (2013.01); *G09G 2300/0814* (2013.01); *G09G 2300/0833* (2013.01)
USPC ................................ 345/90; 345/99; 345/205

(58) Field of Classification Search
USPC ........................ 345/98, 100, 90, 92, 205, 206
See application file for complete search history.

(56) References Cited

U.S. PATENT DOCUMENTS 4,623,908 A * 11/1986 Oshima et al. .................. 257/66
5,296,847 A 3/1994 Takeda et al.
5,650,636 A * 7/1997 Takemura et al. .............. 257/59
5,903,249 A * 5/1999 Koyama et al. ................. 345/92
6,064,362 A 5/2000 Brownlow et al.
6,278,428 B1 * 8/2001 Smith et al. ...................... 345/92
7,573,451 B2 8/2009 Tobita
8,816,347 B2 * 8/2014 Yamazaki et al. .............. 257/59
2003/0142052 A1 * 7/2003 Matsumoto ..................... 345/87
2008/0291351 A1 11/2008 Han et al.
2009/0289876 A1 11/2009 Chun

FOREIGN PATENT DOCUMENTS

EP 0 336 570 A1 10/1989
EP 0 807 918 A1 11/1997
GB 2 101 437 A 1/1983
JP 05-142573 A 6/1993
JP 2000-010072 A 1/2000

OTHER PUBLICATIONS

European Search Report for corresponding European Application No. EP 11168815.6 dated Sep. 12, 2011.

(Continued)

*Primary Examiner* — Kent Chang
*Assistant Examiner* — Nelson Rosario
(74) *Attorney, Agent, or Firm* — Renner, Otto, Boisselle & Sklar, LLP.

(57) ABSTRACT

A charge storage circuit for a pixel comprises a charge storage node. First and second series-connected transistors (8,10) are provided for selectively isolating the charge storage node from a first voltage input (9,SL) for supplying a data voltage. The circuit is provided with a voltage follower circuit for replicating a voltage at the charge storage node (12) at another node in the circuit thereby to reduce the drain-source voltage across the second transistor (10). The first transistor forms part of the voltage follower circuit.

26 Claims, 7 Drawing Sheets

(56) References Cited

OTHER PUBLICATIONS

Willem den Boer; "Active Matrix Liquid Crystal Displays"; Elsevier; 2005.

British Search Report for corresponding British Application No. GB1009480.3 dated Sep. 9, 2010.

Tsunashima et al., "Novel Gamma Correction Method Using an Advanced Capacitive Coupling Driving", SID 07 Digest, pp. 1014-1017, ISSN/007-0966X/07/3802.

* cited by examiner

CHARGE STORAGE CIRCUIT FOR A PIXEL, AND A DISPLAY

This nonprovisional application claims priority under 35 U.S.C. §119(a) on Patent Application No. 1009480.3 filed in the United Kingdom on Jun. 7, 2010, the entire contents of which are hereby incorporated by reference.

FIELD OF THE INVENTION

The invention is a low leakage charge storage circuit, suitable for use in, for example, an active matrix display, a DRAM etc. It also relates to a display incorporating one or more charge storage circuits of the invention.

BACKGROUND OF THE INVENTION

FIG. 1 shows a typical active matrix display. Such a display is made up of a matrix 2 of picture elements (pixels), arranged in M rows and N columns. Each pixel row [column] is connected to a respective row [column] electrode, with the column electrodes being connected to the N outputs of a data driver 4 and the row electrodes being connected to the M outputs of a scan driver 6. The circuit of a typical pixel in a liquid crystal display (LCD) is shown in FIG. 2. The pixel comprises a display element 14 which is connected in parallel to a storage capacitor 16 via a common node 12 (also referred to below as a "charge storage node" or "storage node"). The other terminal of the storage capacitor 16 is connected to a common electrode 18, which may in use act as a capacitor bias line. The display element may comprise a pixel electrode which is electrically connected to the charge storage node 12 (and in this case the pixel electrode may constitute the charge storage node 12), and the other terminal of the display element 14 is connected to a counter plate electrode 20. The charge storage node 12 is also connected to the drain of a transistor 10. The source of transistor 10 is connected to the drain of a transistor 8. The source of transistor 8 is connected to a common source line 9 which is driven by one of the outputs from the data driver 4. The gates of 2 series connected transistor 8, 10 are connected together to a gate line 11 which is common to all the pixels of the row and which is connected to a respective output of the scan driver 6.

In use, rows of pixel display data are supplied by the data driver 4 to the source electrodes 9 in synchronism with scan pulses which are supplied by the scan driver 6 to the gate lines 11 in a cyclically repeating sequence. Thus the row of pixels are refreshed one at a time until all of the rows have been refreshed so as to complete the refreshing of a frame of display data. The process is then repeated for the next frame of data.

When the gate line 11 of each pixel receives a scan pulse from the scan driver 6, the voltage on the source electrode 9 causes the storage capacitor 16, and the pixel electrode of the display element, to be charged. When the scan pulse is removed, the transistors 8, 10 isolate the pixel electrode and the storage capacitor from the source electrode 9 so that the optical property of the associated display element 14 corresponds to the stored voltage across the display element 14 until it is refreshed during the next frame. (The voltage across the display element 14 is not necessarily equal to the voltage across the storage capacitor 16, since the counter plate electrode 20 of the display element 14 and the second plate 18 of the storage capacitor 16 may be at different potentials to one another.)

Methods of using capacitive coupling to the pixel electrode in active matrix displays, in order to apply an offset to the data signal voltage, both to minimise the range of signal voltages which is required to produce a full range of pixel luminances from fully off to fully transmissive, and to provide a power efficient means of alternating the polarity of the voltage across the liquid crystal layer in each pixel regions every frame are also well known. Capacitively coupled driving, in which the signal data voltage is supplied to the pixel electrode from the source electrode 9, via transistors 8, 10, during the period the gate line 11 of each pixel receives a scan pulse from the scan driver 6, in order to charge the pixel electrode and storage capacitor 16 to the voltage of the data signal, and then after the scan pulse is removed, an offset is imposed to the data voltage on the pixel electrode via capacitive coupling to the pixel electrode of a second voltage applied to the second plate 18 of the storage capacitor 16, is described in EP0336570A1 (11 Oct. 1989) and U.S. Pat. No. 5,296,847 (22 Mar. 1994, Matsushita) and in Tsunashima et al, SID Digest '07, pp 1014-1017.

The isolation transistors 8, 10 are not perfect. They exhibit a finite leakage drain current as illustrated in FIG. 3 which shows the typical transfer characteristic of an NMOS transistor. The leakage current in the transistor is a function of the drain to source (Vds) and gate to source (Vgs) potentials.

The leakage current results in a degradation of the programmed pixel electrode voltage over time T according to Equation 1 where Vpix is the pixel electrode voltage, Ileak is the leakage current, Cs is the storage capacitance and Clc is display element capacitance.

$$\frac{dVpix}{dT} = \frac{Ileak}{Cs + Clc} \tag{1}$$

The pixel electrode voltage degradation due to leakage current requires the display data to be rewritten to minimise image deterioration during the hold time. A frame refresh rate of 60 Hz is typical. This constant refreshing of the display results in significant power consumption. One approach to reducing this power consumption is to reduce the frame refresh rate. Frame rate reduction is only possible if the degradation of the pixel electrode voltage is reduced. Considering Equation 1, the pixel electrode voltage degradation can be reduced by either increasing the size of the storage capacitor 16 or reducing the leakage current. A larger storage capacitor 16 is not desirable since it would result in increased pixel area and also increased pixel electrode charging time during scanning of each row. Thus, the preferred approach to reducing the frame refresh rate is to reduce the leakage current.

One known technique for reducing the electric field induced leakage current is to replace the 2 series transistors 8 and 10 with 3 or more transistors in series. This is in order to further reduce the drain voltage for each transistor. It may be noted however that the common gate voltage means that the leakage current does not scale with the number of series transistors. Another known technique, shown in FIG. 4, is to use an additional hold capacitor 15 at the junction of the series connected transistors 8, 10. This technique does not provide sufficient reduction in leakage current to enable reduction of frame refresh rate.

FIG. 5(*a*) illustrates another technique to increase the hold time over several frames as disclosed in Japanese laid-open patent application No. 5-142573 (11 Jun. 1993). This technique involves "boot strapping": a unity gain voltage gain amplifier 22 has its input connected to the charge storage node 12 and the pixel electrode and its output connected to the junction between transistors 8 and 10. In other words the circuit of FIG. 5(*a*) is provided with a feedback function through the unity gain voltage amplifier 22, so that the pixel electrode voltage appears at the junction of the series connected transistors 8 and 10. If the buffer amplifier 22 were ideal and drew no charge from the pixel electrode, leakage from the pixel electrode would be eliminated since the drain to source voltage of transistor 10 would be reduced to zero volts. Examples of buffer amplifier 22 circuits disclosed shown in FIG. 5(*b*) include a CMOS source follower circuit 24 that combines an NMOS transistor and a PMOS transistor, a CMOS 2 stage source follower circuit 26 and voltage follower circuit that uses an operational amplifier 28. All of the proposed implementations of the buffer amplifier 22 result in at least 2 additional transistors and 2 power supply lines which results in an increase in the pixel circuit area. The additional transistors will reduce the yield during the fabrication of the display. Further, the increased active pixel area limits the minimum achievable pixel size and therefore limits the maximum resolution of the display. If a display is of a transmissive or transflective type, the increased active area of the pixel results in reduced light transmission from the backlight through the pixels which reduces the brightness of the display.

U.S. Pat. No. 6,064,362 (16 May 2000) and U.S. Pat. No. 7,573,451 (11 Aug. 2009) disclose a pixel circuit with a feedback buffer amplifier which as in the Japanese laid-open patent application No. 5-142573 aims to reduce the leakage from the storage node. The buffer amplifier in both disclosures consists of at least 2 additional transistors.

The power consumption of each of these 3 previous pixel circuits is dominated by the power consumption of the buffer amplifier which will make a significant contribution to the total power consumption of the active matrix display.

Transistor Characteristics

FIG. 3 illustrates typical n-channel transistor input characteristics. As the gate voltage increases from a low value, the drain current initially increases exponentially—and then flattens out (meaning that the rate of increase of the drain current with gate voltage becomes lower for higher gate voltages). This exponentially increasing characteristic is the subthreshold region of the transistor operation. The figure also shows the dependence of the drain current on the drain potential. In the subthreshold region, the gate voltage has a significantly greater influence upon the drain current compared with the drain voltage. For example, 0.25V change in gate voltage results in 40 times change in the drain current whereas an 8V change in the drain voltage is necessary to achieve the same drain current change.

SUMMARY OF THE INVENTION

A first aspect of the invention provides a charge storage circuit for a pixel, the circuit comprising: a charge storage node; first and second transistors for selectively isolating the charge storage node from a first voltage input for supplying a data voltage, the first and second transistors being series-connected; and a voltage follower circuit for replicating a voltage at the charge storage node (12) at another node in the circuit such that the drain-source voltage across the second transistor is reduced; wherein the voltage follower circuit comprises the first transistor.

The present invention employs a voltage follower to reduce the leakage current through the first and second transistors, which are isolation transistors for isolating, in a voltage holding mode, the charge storage node from the voltage input. The voltage follower replicates, as closely as possible, the voltage at the charge storage node at another node in the circuit so that the drain-source voltage across the second transistor is reduced. The drain-source voltage across the second transistor preferably reduced to zero or almost to zero (and is reduced to zero if the voltage follower circuit exactly replicate the voltage at the charge storage node (12) at the other node). This reduction in the drain-source voltage across the second transistor leads to a reduction in the leakage current through the second transistor (and in principle the leakage current through the second transistor may be reduced to zero if the drain-source voltage across the second transistor is reduced to zero). According to the invention, one of the isolation transistors is used as part of the voltage follower, thereby reducing the number of additional components that must be provided for the voltage follower and also reducing the area occupied by the voltage follower. The invention thus reduces the leakage current, and hence reduces the required frame refresh rate, for little or no increase in the area of the pixel.

Advantages of the invention over the prior art include the following:

- The voltage follower and the feedback functionality which is used to minimise the leakage current from the pixel storage node is achieved by the re-using of the first isolation transistor and one additional transistor and power supply line.
  - Minimal increase in the active pixel area
- Lower power consumption
- No impact on the pixel electrode voltage charge time

BRIEF DESCRIPTION OF THE DRAWINGS

Preferred embodiments of the invention will be described by way of illustrative example with reference to the accompanying figures in which.

DESCRIPTION OF PREFERRED EMBODIMENTS

First Embodiment

Figure 6:
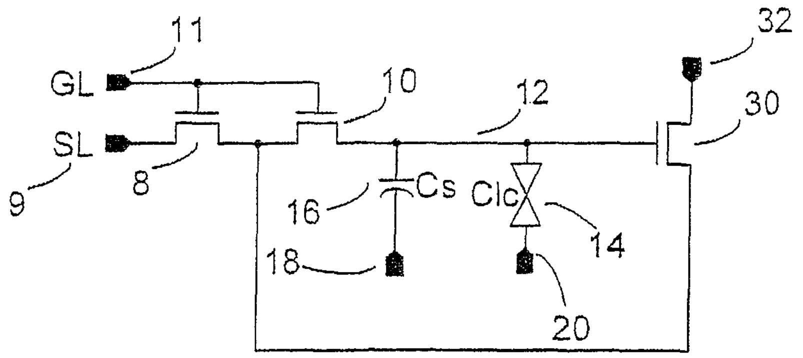
FIG. 6 shows a pixel circuit according to a first embodiment

A first embodiment is shown in FIG. 6. This consists of a pixel circuit for an active matrix display. The circuit contains the following elements:

- A first transistor 8
- A capacitor Cs 16
- A second transistor 10
- A third transistor 30

Connections supplied to the pixel are as follows:

- A source line 9 which is shared between the pixels in the same column
- A gate addressing line 11 which is shared between the pixels in the same row A capacitor bias line 18 which may be shared between the pixels in the same row or same column or across the whole pixel matrix A power supply line 32 which may be shared between the pixels in the same row or same column or across the whole pixel matrix Also shown is a load element Clc 14 representing the impedance of the optical element between the charge storage node 12 and the counter plate node 20 in the case of a liquid crystal display. (In the case of an active matrix display, the counter plate node 20 may be common to all pixels of the display and so form a common electrode.)

The circuit is connected as follows:

The source line 9 is connected to the source of the first transistor 8. The drain of first transistor 8 is connected to the source of second transistor 10. The gate line 11 is connected to the gates of the first and second transistors 8, 10. The drain of second transistor 10 is connected to the storage node 12. The storage capacitor Cs 16 is connected between the storage node 12 and the capacitor bias line 18. The load element Clc 14 is connected between storage node 12 and the counter plate node 20 (so that the storage node 12 can also be considered as forming the pixel electrode). The storage node 12 is also connected to the gate of the third transistor 30. The drain of the third transistor 30 is connected to the power supply line 32 and the source of the third transistor 30 is connected to a first node between the first transistor and the second transistor—in this embodiment the first node is connected to the drain of the first transistor 8 and source of the second transistor 10.

The operation of the circuit is as follows:

In operation the circuit performs two functions, first writing a voltage to the storage node 12 and then holding the voltage written on to the storage node 12.

Figure 2:
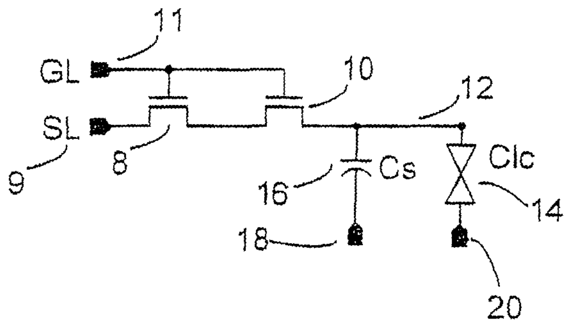
FIG. 2 shows a typical pixel circuit

The voltage writing mode is the same as that of a standard active matrix display described in the prior art, for example is the same as described above with reference to the circuit of FIG. 2. That is, when the gate line 11 of each pixel receives a scan pulse from the scan driver 6, the transistors 8, 10 are turned ON and electrically connect the source electrode 9 to the charge storage node (pixel electrode) 12 so that the voltage on the source electrode 9 causes the pixel electrode of the display element and the storage capacitor 16 to be charged. When the scan pulse is removed, the first and second transistors 8, 10 are turned OFF and isolate the pixel electrode and charge storage node 12 from the source electrode 9 so that the optical property of the associated display element 14 corresponds to the voltage across the display element 14 until it is refreshed during the next frame. Thus, the first and second transistors 8, 10 selectively isolate the charge storage node 12 from a voltage input (i.e., from the source electrode 9).

If desired, after the scan pulse is removed, an offset may be imposed to the data voltage on the pixel electrode via capacitive coupling to the pixel electrode of a second voltage applied to the second plate 18 of the storage capacitor 16. The voltage holding mode is, in this embodiment, enabled once all rows of the pixel matrix have been written.

During the voltage holding mode, the source line 9 is programmed by the scan driver 6 at a voltage which biases the first transistor 8 in the subthreshold region. This voltage is preferably set to be the same as the low level of the gate line 11 voltage, resulting in the first transistor biased with zero volts gate-source voltage (Vgs). The power supply line 32 is, in use, maintained at a voltage level higher than the highest data voltage during the hold mode (and also during the write function as well). With these bias conditions the third transistor 30 and first transistor 8 forms a voltage follower with the input being the data voltage written on to the storage node 12 and the output connected to the source of the second transistor 8. Alternatively, the Vgs of the first transistor 8 may be set to a non-zero value to allow optimisation of the bias current and therefore the power consumption. (The amount by which the voltage Vgs may vary from zero will depend on the transistor process conditions, but typically may vary from zero by up to a few hundred millivolts.)

The voltage follower replicates, as closely as possible, the voltage at the charge storage node at another node in the circuit so that the drain-source voltage across the second transistor 10 is reduced, and preferably is reduced to zero or almost to zero. In the circuit of FIG. 6 the voltage follower may for example replicate the voltage at the charge storage node at a node between the first transistor 8 and the second transistor 10. As a result the leakage current through the second transistor 10 is reduced (and would be reduced to zero if the drain-source voltage across the second transistor 10 is reduced to zero).

Figure 3:
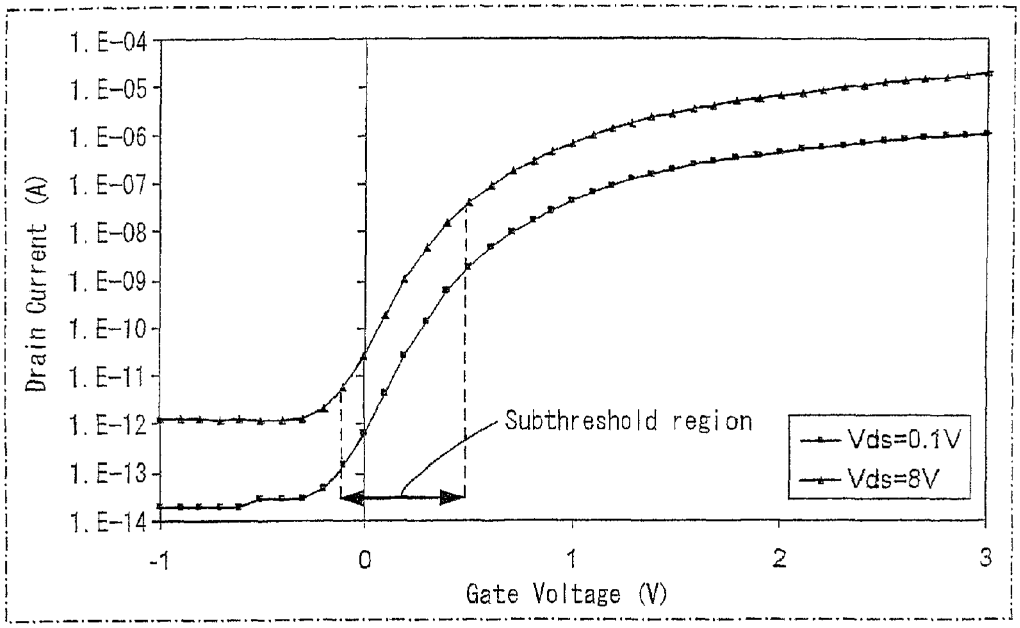
FIG. 3 shows typical transfer characteristics of an n-type MOS transistor
Figure 4:
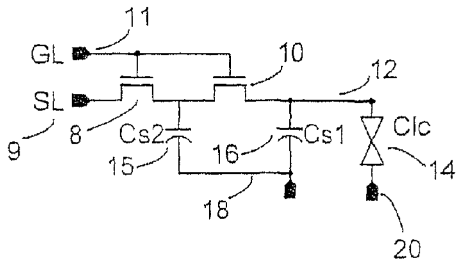
FIGS. 4 and 5 show prior pixel circuits for reducing leakage current from storage node
Figure 5:
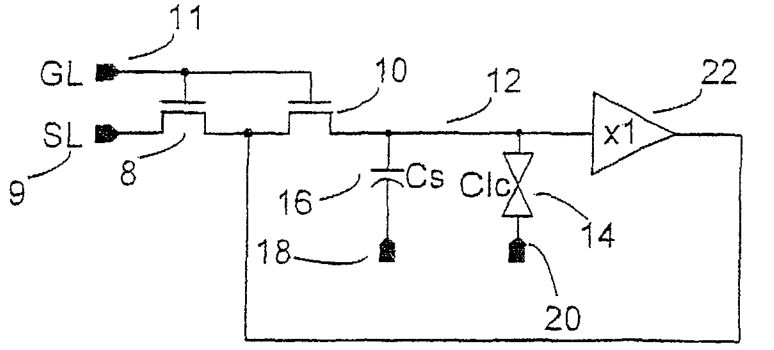
Figure 5:
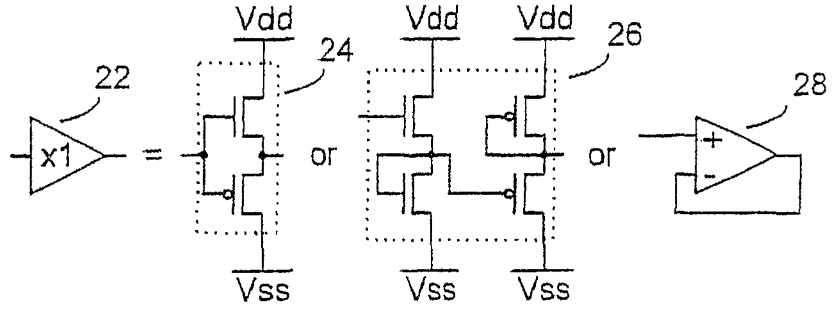

In more detail, the voltage follower operates as follows:

The first transistor 8 is typically biased with a 0V Vgs, which sets the bias current to a first order since the drain current of a transistor biased in the subthreshold region is only weakly dependant on the drain-source voltage (Vds) of a transistor as shown in FIG. 3. The bias current set by the first transistor 8 must also pass through the channel of the third transistor 30 assuming the leakage current through the second transistor 10 is negligible compared to the bias current. Assuming the first and third transistors 8, 30 are matched in terms of dimensions, threshold voltage and mobility, the third transistor 30 passes the same current as the first transistor when the two transistors have the same bias conditions (Vgs and Vds). These conditions are present when the pixel electrode voltage Vpix (which is the voltage at the storage node 12) is exactly half way between the power supply line 32 voltage and the source line 9 voltage. In this instance, the Vgs of the third transistor 30 is zero volts and thus the output voltage of the voltage follower is the same as its input voltage resulting in a better voltage follower. The Vds of the second transistor 10 is thus reduced to zero volts which reduces the field induced leakage current from the storage node 12 to zero. For pixel electrode voltages higher than the mid-rail voltage, the Vds of transistor 30 decreases. A decrease in the Vds requires the gate-source voltage of the third transistor 30 to slightly increase from 0V in order to maintain the bias current sunk by the first transistor 8. For pixel electrode voltages lower than the mid-rail voltage, the Vds of transistor 30 increases. An increase in the Vds requires the Vgs of the third transistor 30 to slightly decrease below 0V in order to maintain the bias current sunk by the first transistor 8. For a typical storage node voltage range of 5V and centred around the mid-point between the power supply line 32 voltage and the source line 9 bias voltage, the Vgs of the third transistor 30 will typically vary between +100 mV and −100 mV (for Vgs=zero on the first transistor 8). This range represents the worst case errors of the voltage follower formed by the first and third transistors 8, 30 (where the "error" of the voltage follower is the difference between the input voltage to the voltage follower and the output voltage from the voltage follower).

The write function is repeated when the storage node data requires updating.

Advantages of this embodiment include the following:

During the voltage holding mode, a voltage follower is used to minimise the field induced leakage current from the storage node. The voltage follower is implemented by re-using the first isolation transistor as the bias device during the hold function. This pixel circuit has fewer transistors and therefore a smaller active area compared to prior art pixel circuits that use a voltage follower to reduce the leakage current.

Figure 7:
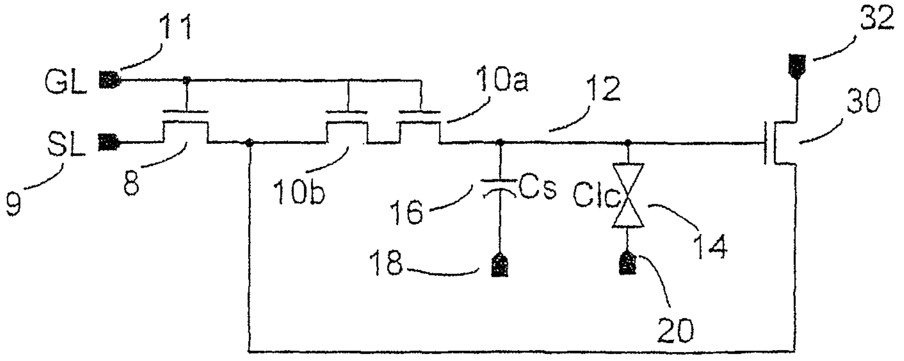
FIG. 7 shows a pixel circuit with a dual gate isolation transistor according to a modification of the first embodiment

It will be apparent to one skilled in the art that this embodiment could also be implemented with the second transistor 10 formed as a dual gate transistor 10*a*, 10*b* as shown in FIG. 7. This implementation further reduces the leakage current from the storage node compared with a single gate transistor 10. Since the node at the source of transistor 8 is biased, the dual gate transistor 10*a*, 10*b* has the same electric field reduction effect as a standard pixel circuit shown in FIG. 2.

Second Embodiment

Figure 8:
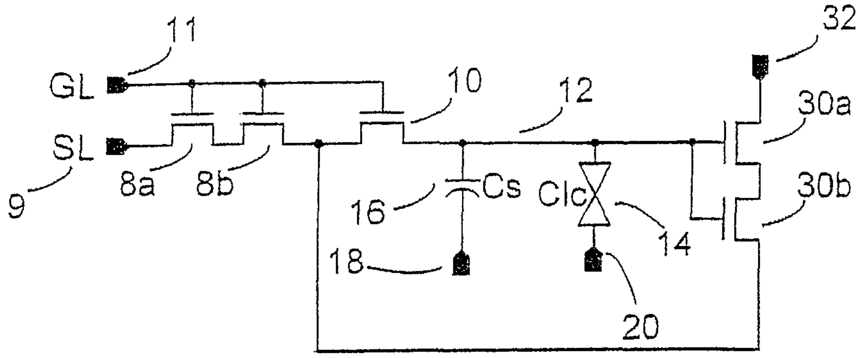
FIG. 8 shows a pixel circuit according to a second embodiment

A second embodiment is shown in FIG. 8. This embodiment is identical to the first embodiment except transistor 8 is replaced by two series connected transistors 8*a*, 8*b* whose gates are connected to the gate line 11 and transistor 30 is replaced by two series connected transistors 30*a*, 30*b* whose gates are connected to the storage node 12.

The operation of the circuit is the same as the first embodiment. The voltage follower which is necessary for the voltage holding mode is now formed by the four transistors 8*a*, 8*b*, 30*a* and 30*b*.

This voltage follower operates as follows:

Transistors 8*a* and 30*b* have the same function as transistors 8 and 30 in the first embodiment. The voltage follower performs well when the bias conditions of transistors 8 and 30 are the same. As in the first embodiment, transistor 8*a* is biased in the subthreshold region with typical Vgs of zero volts. The role of transistors 8*b* and 30*a* act is to provide similar bias conditions for transistors 8*a* and 30*b* as the input voltage. This behaviour can be demonstrated by considering the two cases of pixel electrode voltages, Vpix: a high value close to the power supply line voltage and a low value close to the source line voltage.

For the case of a high value pixel electrode voltage, Vpix:

Transistor 8*a* sets the bias current: Vgs=0V, Vds=small

Transistor 30*a* must pass the bias current: Vgs=very small, Vds=very small

Transistor 30*b* must pass the bias current: Vgs=small, Vds=very small

Transistor 8*b* must pass the bias current: Vgs=small (negative), Vds=large

In this case, transistor 8*b* has absorbed a large Vds which results in transistors 8*a* and 30*b* having very similar bias conditions.

For the case of a low value pixel electrode voltage, Vpix:

Transistor 8*a* sets the bias current: Vgs=0V, Vds=small

Transistor 30*a* must pass the bias current: Vgs=very small (negative), Vds=large Transistor 30*b* must pass the bias current: Vgs=small, Vds=very small Transistor 8*b* must pass the bias current: Vgs=small (negative), Vds=small In this case, transistor 30*a* has absorbed a large Vds which results in transistors 8*a* and 30*b* having very similar bias conditions.

An advantage of this embodiment is as follows

The voltage follower error (difference between the input and output voltages) is minimised across the whole of the input voltage range by ensuring that transistors 8*a* and 30*b* operate with similar bias conditions.

Third Embodiment

Figure 9:
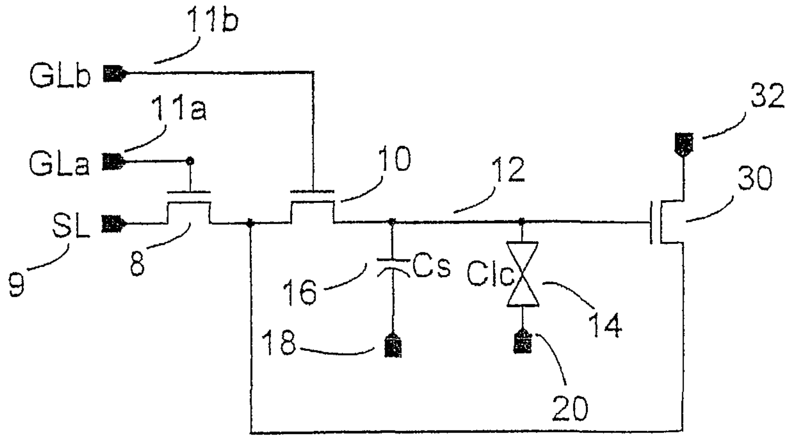
FIG. 9 shows a pixel circuit according to a third embodiment

A third embodiment is shown in FIG. 9. This embodiment is identical to the first embodiment except the gate line 11 is split into 2 separate gate lines 11*a* and 11*b*. A first gate line 11*a* is connected to the gate of the first transistor 8 and a second gate line 11*b* is connected to the gate of the second transistor 10. The operation of this embodiment is the same as the first embodiment except the first and second gate lines 11*a* and 11*b* are driven separately. The driving voltages of both the gate lines are typically the same. However, there may be instances when it is desirable to independently control the bias voltage on the gate of transistor 8 and the switching voltage on the gate of transistor 10. The advantage of this embodiment is that the separate gate lines 11*a*, 11*b* allow independent control of the voltage follower bias voltage on the first gate line 11*a* and therefore the bias current of the voltage follower. Additionally, the voltage on the second gate line 11*b* may also be adjusted to ensure that transistor 10 operates at the minimum leakage point. The power consumption and operating point of the pixel circuit may therefore be optimised using this embodiment.

Fourth Embodiment

Figure 10:
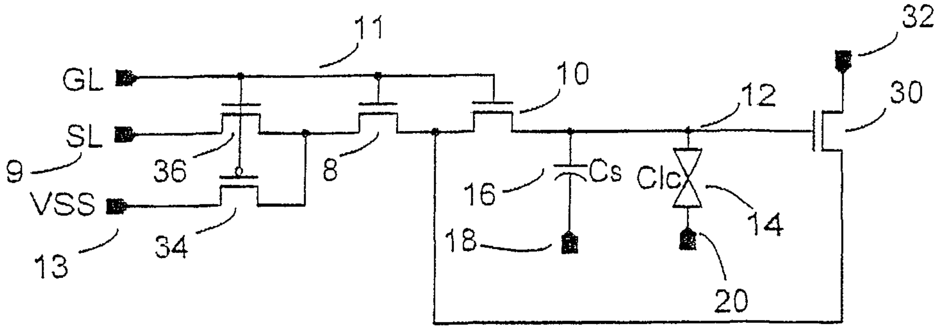
FIG. 10 shows a pixel circuit according to a fourth embodiment

A fourth embodiment is shown in FIG. 10, and is identical to the first embodiment except two additional transistors 34, 36 and one bias line 13 has been added. The polarity of the channel of the fifth transistor 34 is opposite of the rest of the transistors in the pixel circuit. Typically, transistor 34 is p-type and the rest of the transistors in the pixel circuit are n-type. The source of the fourth transistor 36 is connected to the source line 9. The drain of the fourth transistor 36 is connected to the source of the first transistor 8. The gate of the fourth transistor 36 is connected to the gate line 11. The source of the fifth transistor 34 is connected to the bias line 13 (which forms a third voltage input), its drain is connected to a second node between the first transistor and the fourth transistor 36 (in this embodiment the second node is between the source of the first transistor 8 and the drain of the fourth transistor 36), and the gate of the fifth transistor 34 is connected to the gate line 11.

In operation the circuit performs two functions, writing a voltage to the storage node 12 and holding the voltage written on to the storage node 12.

The write function is the same as the previous embodiments except transistor 34 is switched off when the gate line 11 receives a scan pulse from the scan driver 6. The write operation on each row is completed when the scan pulse is removed from the gate line 11 to switch off the two transistors 10, 36. This step also switches on transistor 34. The voltage holding mode is enabled on a row by row basis immediately after each row has been written. The switched on transistor 34 passes the bias line 13 voltage to the source of transistor 8. As in the first embodiment, transistors 8 and 30 form a voltage follower with transistor 8 biased in the subthreshold region with a typical 0V Vgs.

An advantage of this embodiment is that once a pixel been written, the voltage holding mode can be activated immediately by using the bias line 13 to bias the voltage follower. Source line 9 can continue to be used to write to pixels of other rows of the active matrix display. Pixel electrode voltage degradation due to source line voltage variations is thus avoided. (The pixel area in this embodiment is likely to be greater than in other embodiments, owing to the need for the additional supply line and transistors.)

It will be apparent to one skilled in the art that this embodiment could also be implemented with the transistor 34 formed as an n-type transistor. In this case a separate gate line is required to control the switch transistor 34. This gate line is then driven with voltage signals that are complementary to those applied to gate line 11.

It will be apparent to one skilled in the art that above embodiments could also be implemented using transistors of a complementary type to those described in these embodiments. Complementary signal and power lines must also be applied, that is active low voltages are applied instead of active high voltages and vice versa.

Figure 1:
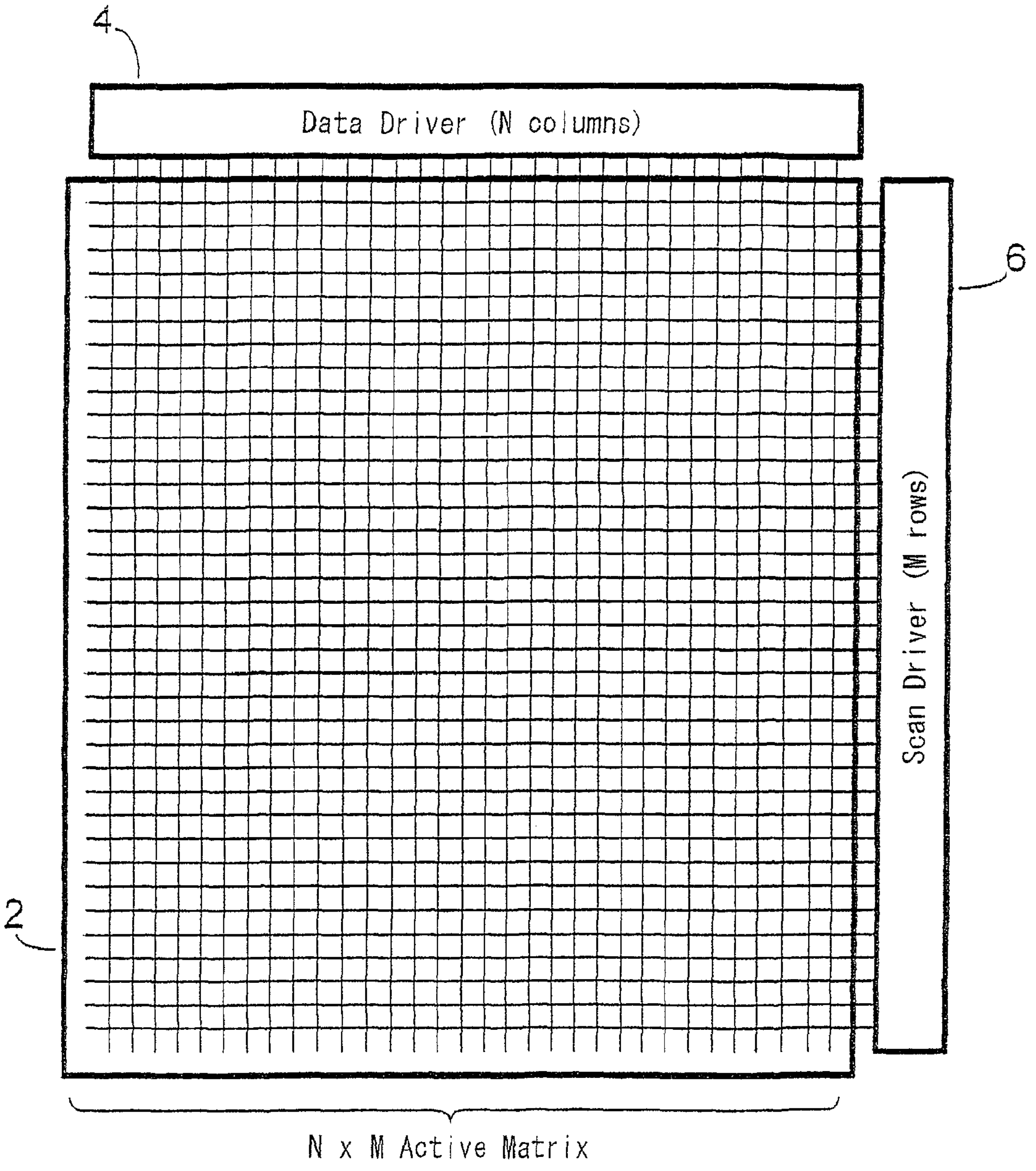
FIG. 1 shows a typical active matrix liquid crystal display

A circuit of the invention may be applied in an active matrix LCD, for example to the AMLCD of FIG. 1. For example, each pixel of AMLCD may have a circuit of the present invention.

It will be apparent to one skilled in the art that any of the previous embodiments are not restricted to active matrix LCD. The embodiments may be applied to other active matrix display technologies such as organic light emitting diode (OLED) displays, micro electro-mechanical (MEMs) displays and electro-wetting displays. The embodiments may be applied as a single circuit or as part of an array or as part of a matrix which is used to store voltage data. One example of this type of application is dynamic random access memories (DRAM).

It will be apparent to one skilled in the art that features of the above embodiments may be combined with one another. For example, while the second transistor 10 is described as embodied by a dual gate transistor in FIG. 7, the feature may be provided in other embodiments, such as the embodiments of FIGS. 8-10, if desired. As another example, the feature of independent control of the gates of the first and second transistors 8, 10 as shown in FIG. 9 may be provided in other embodiments, such as the embodiments of FIGS. 8 and 10, if desired.

A first aspect of the invention provides a charge storage circuit for a pixel, the circuit comprising: a charge storage node; first and second transistors for selectively isolating the charge storage node from a first voltage input for supplying a data voltage, the first and second transistors being series-connected; and a voltage follower circuit for replicating a voltage at the charge storage node (12) at another node in the circuit such that the drain-source voltage across the second transistor is reduced; wherein the voltage follower circuit comprises the first transistor.

The present invention employs a voltage follower to reduce the leakage current through the first and second transistors, which are isolation transistors for isolating, in a voltage holding mode, the charge storage node from the voltage input. The voltage follower replicates, as closely as possible, the voltage at the charge storage node at another node in the circuit so that the drain-source voltage across the second transistor is reduced. The drain-source voltage across the second transistor preferably reduced to zero or almost to zero (and is reduced to zero if the voltage follower circuit exactly replicate the voltage at the charge storage node (12) at the other node). This reduction in the drain-source voltage across the second transistor leads to a reduction in the leakage current through the second transistor (and in principle the leakage current through the second transistor may be reduced to zero if the drain-source voltage across the second transistor is reduced to zero). According to the invention, one of the isolation transistors is used as part of the voltage follower, thereby reducing the number of additional components that must be provided for the voltage follower and also reducing the area occupied by the voltage follower. The invention thus reduces the leakage current, and hence reduces the required frame refresh rate, for little or no increase in the area of the pixel.

The first and second transistors may be connected in series between the first voltage input and the charge storage node, the second transistor being connected between the first transistor and the charge storage node. In this embodiment the voltage follower may replicates, as closely as possible, the voltage at the charge storage node at a node between the first transistor and the second transistor.

The circuit may further comprise a third transistor connected between (i) a second voltage input and (ii) a first node between the first transistor and the second transistor, a gate of the third transistor being connected to the charge storage node, the voltage follower circuit comprising the first transistor and the third transistor and, in use, replicating a voltage at the charge storage node at the first node.

A source of the first transistor may be connected to the first voltage input, a drain of the third transistor is connected to the second voltage input, and a source of the third transistor is connected to the first node.

The first transistor and the third transistor may be substantially matched with one another. By saying that two transistors are "matched" with one another is meant that they are matched (to within normal manufacturing tolerances) in at least one, and preferably all of, the following: dimensions (width and length of the transistor), threshold voltage, mobility.

The circuit may be arranged such that, in a voltage holding mode, a gate-source bias voltage applied to the first transistor is equal or substantially equal to a gate-source bias voltage applied to the third transistor. If the gate-source bias voltage applied to the first transistor is equal to the gate-source bias voltage applied to the third transistor, then the first transistor and the third transistor pass the same current (assuming they are matched to one another). This results in zero leakage current through the second transistor.

The circuit may be adapted to apply, in a voltage holding mode, a gate-source bias voltage to the first transistor that biases the first transistor in a sub-threshold region of operation, for example in the sub-threshold region described above with reference to FIG. 3.

The circuit may be adapted to apply, in a voltage holding mode, a gate-source bias voltage to the first transistor that is zero or substantially zero. This reduces the power consumption of the charge storage circuit.

The second voltage input may provide, in use, a voltage that is greater than the highest data voltage supplied in use by the first voltage input.

The second transistor may be a dual gate transistor.

The first transistor and the third transistor may each comprise two series-connected transistors.

The circuit may further comprise: a fourth transistor connected in series between the first voltage input and the first transistor; and a fifth transistor connected between (i) a third voltage input and (ii) a second node between the first transistor and the fourth transistor; and the circuit may be operable such that in a voltage holding mode the fifth transistor is ON whereby the second node is connected to the third voltage input. In this embodiment the voltage holding mode may be enabled as soon as a voltage has been written to the charge storage node, by biasing the first transistor using he third voltage input.

The circuit may be operable such that in the voltage holding mode the fourth transistor is OFF, and may be operable such that in a voltage writing mode the fourth transistor is ON and the fifth transistor is OFF.

The fourth transistor may be of opposite conductivity type to the fifth transistor and the gate of the fourth transistor may be connected to the gate of the fifth transistor. This is a convenient way of ensuring that the fourth transistor is ON when the fifth transistor is OFF and vice versa. Alternatively the fourth transistor may be of the same conductivity type as the fifth transistor, with the gates of the fourth transistor and the fifth transistor being controlled by complementary gate signals.

The gate of the fourth transistor may be connected to the gate of the first transistor.

The circuit may comprise a first gate line connected to the gate of the first transistor and a second gate line connected to the gate of the second transistor. This allows independent control of the voltage follower bias voltage. Alternatively the gate of the second transistor may be connected to the gate of the first transistor.

The circuit may comprise a storage capacitor connected to the charge storage node. It may comprise a display element connected to the charge storage node. The display element may be a liquid crystal display element.

Each transistor may be a MOSFET.

A second aspect of the invention provides a display comprising a charge storage circuit of the first aspect. The advantage of a lower frame refresh rate will also apply to a display that uses a charge storage circuit of the invention.

The display may be an active matrix liquid crystal display (AMLCD).

The AMLCD may have a matrix of pixels, and each pixel may have a charge storage circuit of the first aspect The AMLCD may be arranged to have a voltage writing mode for writing voltages to rows of pixels. After voltages have been written to all pixel rows of the AMLCD, the charge storage circuits of the AMLCD are switched to a voltage holding mode.

Alternatively, if each charge storage circuit is a charge storage circuit having the fourth and fifth transistors, the AMLCD may be arranged to have, for each pixel row, a voltage writing mode for writing to that row and a voltage holding mode.

The invention is a low leakage charge storage circuit, suitable for use within pixels in active matrix displays.

The circuit is composed of at least three MOS transistors. The channels of the first two transistors are series connected. The source of the first transistor is connected to an input line and the drain of the second transistor is connected to a storage capacitor, forming a storage node. The storage node is connected to the gate of the third transistor which has its drain connected to a supply line and its source connected to the junction of the series connected first and second transistors.

Pixel data is written to the storage node by applying a scan pulse to the gates of the first and second transistors. When the scan pulse is removed, the pixel electrode voltage is maintained on the storage node by minimising the source-drain electric field of the second transistor by using a voltage follower to create a copy of the pixel electrode voltage and applying this to the source of the second transistor. The voltage follower is formed by the third and first transistors. The storage node forms the input of the voltage follower and the output is connected to the source of the second transistor. The bias current of the voltage follower is set by the gate and source voltages of the first transistor.

The first transistor performs two roles. During the data writing mode it behaves as an isolation switch and during the data hold mode it is used to bias the voltage follower.

Although the invention has been shown and described with respect to certain preferred embodiments, it is obvious that equivalents and modifications will occur to others skilled in the art upon the reading and understanding of the specification. The present invention includes all such equivalents and modifications, and is limited only by the scope of the following claims.

Industrial Applicability

The invention is industrially applicable. A low leakage charge storage circuit of the invention is suitable for use in, for example, an active matrix display or a DRAM.

The invention claimed is:

1. A charge storage circuit for a pixel, the circuit comprising:

a charge storage node;

first and second transistors for selectively isolating the charge storage node from a first voltage input for supplying a data voltage, the first and second transistors being series-connected;

a voltage follower circuit for replicating a voltage at the charge storage node at another node in the circuit thereby to reduce the drain-source voltage across the second transistor; and a third transistor connected between (i) a second voltage input and (ii) a first node between the first transistor and the second transistor, a gate of the third transistor being connected to the charge storage node, the voltage follower circuit comprising the first transistor and the third transistor, where in a voltage holding mode the first transistor and the third transistor pass the same current.

2. A circuit as claimed in claim 1 wherein the first and second transistors are connected in series between the first voltage input and the charge storage node, the second transistor being connected between the first transistor and the charge storage node.

3. A circuit as claimed in claim 1 wherein a source of the first transistor is connected to the first voltage input, a drain of the third transistor is connected to the second voltage input, and a source of the third transistor is connected to the first node.

4. A circuit as claimed in claim 1 wherein the first transistor and the third transistor are substantially matched with one another.

5. A circuit as claimed in claim 4 and arranged such that, in a voltage holding mode, a gate-source bias voltage applied to the first transistor is equal or substantially equal to a gate-source bias voltage applied to the third transistor.

6. A circuit as claimed in claim 1 and adapted to apply, in a voltage holding mode, a gate-source bias voltage to the first transistor that biases the first transistor in a sub-threshold region of operation.

7. A circuit as claimed in claim 1 and adapted to apply, in a voltage holding mode, a gate-source bias voltage to the first transistor that is zero or substantially zero.

8. A circuit as claimed in claim 1 wherein the second voltage input provides, in use, a voltage that is greater than the highest data voltage supplied in use by the first voltage input.

9. A circuit as claimed in claim 1 wherein the second transistor is a dual gate transistor.

10. A circuit as claimed in claim 1 wherein the first transistor and the third transistor each comprise two series-connected transistors.

11. A circuit as claimed in claim 1 and further comprising:

a fourth transistor connected in series between the first voltage input and the first transistor; and a fifth transistor connected between (i) a third voltage input and (ii) a second node between the first transistor and the fourth transistor;

the circuit being operable such that in a voltage holding mode the fifth transistor is ON whereby the second node is connected to the third voltage input.

12. A circuit as claimed in claim 11 and operable such that in the voltage holding mode the fourth transistor is OFF.

13. A circuit as claimed in claim 11 and operable such that in a voltage writing mode the fourth transistor is ON and the fifth transistor is OFF.

14. A circuit as claimed in claim 11 wherein the fourth transistor is of an opposite conductivity type to the fifth transistor and wherein the gate of the fourth transistor is connected to the gate of the fifth transistor.

15. A circuit as claimed in claim 11 wherein the gate of the fourth transistor is connected to the gate of the first transistor.

16. An AMLCD comprising a matrix of pixels, and a plurality of charge storage circuits, each charge storage circuit being a charge storage circuit as defined in claim 11;

wherein each pixel has one of the charge storage circuits of the plurality of charge storage circuits; and wherein the AMLCD is arranged to have, for each pixel row, a voltage writing mode for writing to that row and a voltage holding mode.

17. A circuit as claimed in claim 1 and comprising a first gate line connected to the gate of the first transistor and a second gate line connected to the gate of the second transistor.

18. A circuit as claimed in claim 1 wherein the gate of the second transistor is connected to the gate of the first transistor.

19. A circuit as claimed in claim 1 and comprising a storage capacitor connected to the charge storage node.

20. A circuit as claimed in claim 1 and comprising a display element connected to the charge storage node.

21. A circuit as claimed in claim 20 wherein the display element is a liquid crystal display element.

22. A circuit as claimed in claim 1 wherein each transistor is a MOSFET.

23. A display comprising a charge storage circuit as defined in claim 1.

24. A display as claimed in claim 23 wherein the display is an active matrix liquid crystal display (AMLCD).

25. An AMLDC as claimed in claim 24 and having a matrix of pixels, wherein the AMLCD comprises a plurality of charge storage circuits and each pixel has one of the charge storage circuits of the plurality of charge storage circuits.

26. An AMLCD as claimed in claim 25 and arranged to have a voltage writing mode for writing voltages to rows of pixels.

* * * * *